Patented Dec. 26, 1950

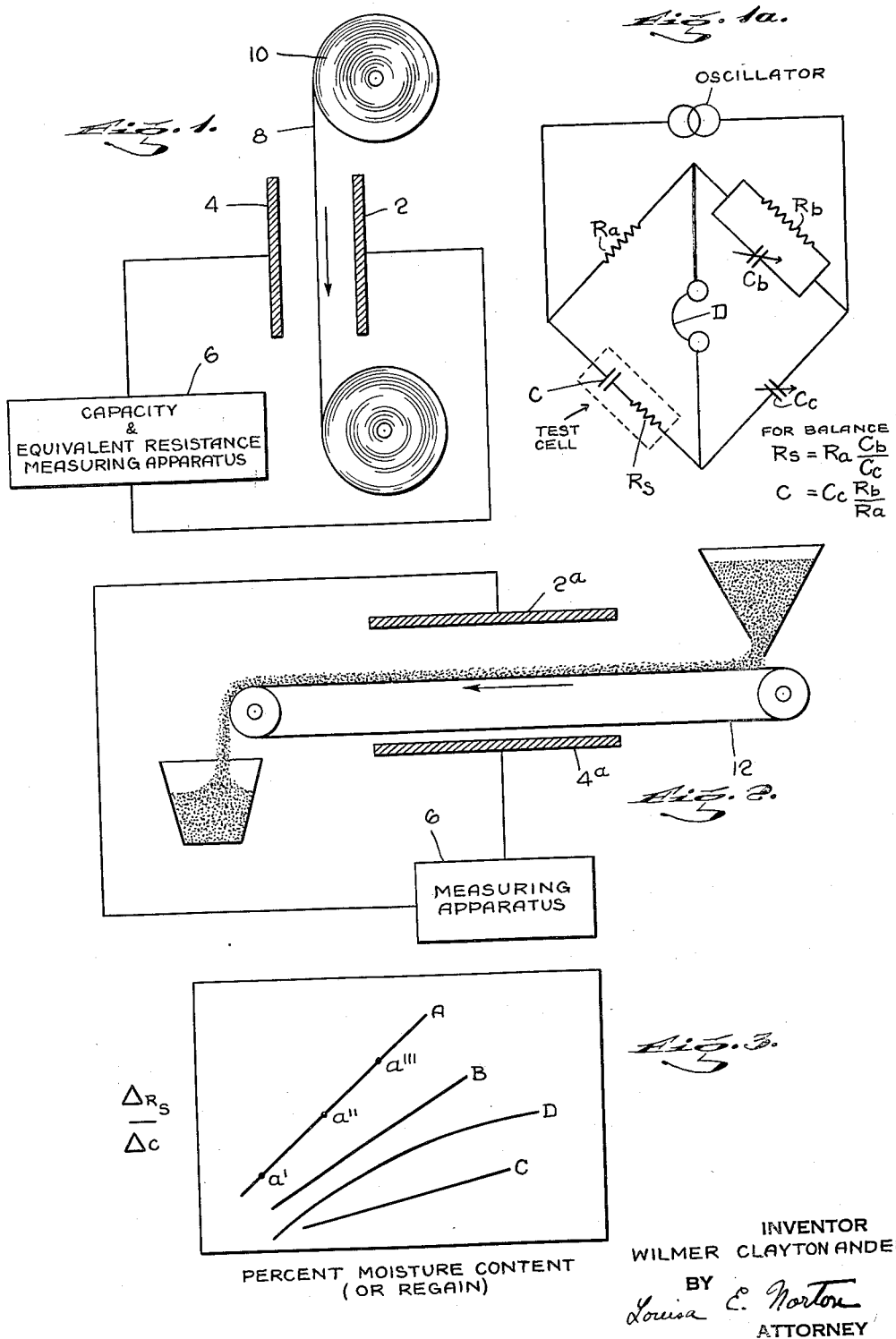

2,535,026

UNITED STATES PATENT OFFICE 2,535,026

MOISTURE DETERMINATION

Wilmer Clayton Anderson, Greenwich, Conn., assignor to Deering Milliken Research Trust, New York, N. Y., a nonprofit trust of New York Application February 21, 1947, Serial No. 730,154

7 Claims. (Cl. 175—183)

My present invention relates to the measurement of moisture content of materials such as textile materials, paper, wood, grain or the like and comprises a new method of moisture content measurement which is accurate and rapid and may be used for measurements on continuously moving as well as on stationary material. As compared to methods heretofore in use, the new method is substantially independent of the weight or thickness of the material being tested.

The following brief discussion will assist in understanding the theory upon which the new method of the invention is based. If a material, such as yarn or the like, is inserted between the plates of an air condenser, the capacity of the condenser changes and this change in capacity depends upon the particular material, its weight and dimensions and upon its moisture content. Insertion of the material between the condenser plates also changes the equivalent series resistance of the condenser and such change likewise depends on the type of material, its weight and dimensions and its moisture content. Some methods heretofore suggested or practiced have utilized either changes in capacity or changes in resistance or changes in total impedance in an attempt to obtain determinations of moisture content. As indicated above, none of these variations are dependent solely upon the moisture content of the material, and hence methods relying upon either capacity measurement alone or resistance measurement alone or upon impedance measurement have not been satisfactory as they necessitated equality in weight and dimensions of test and standard samples. As a result of theoretical considerations which have been confirmed experimentally, I have found that if the change in equivalent series resistance, $\Delta R_s$, and the change in capacity, $\Delta C$, are measured and their ratio taken, determinations of moisture content may be made without requiring that the weight and dimensions of test samples be equal to those of a standard sample. This ratio, $\Delta R_s/\Delta C$, is a measure of the per cent moisture content over a relatively wide range of percentage moisture content, provided the thickness of the sample is relatively small as compared to the distance between the condenser plates. Thus, for any given type of material, once the relationship between the percentage of moisture content and the ratio $\Delta R_s/\Delta C$ is obtained, a scale or table may be set up for that particular type of material and percentage moisture content of other samples of such material immediately determined from capacity and resistance measurements. For example, in the textile industry, once separate scales are made up for each composition of fabric or yarn, for example, cotton, wool, rayon, etc., per cent moisture content or per cent moisture regain of any of these materials, irrespective of their weight or thickness, can be readily determined. Similarly, in the case of measurement of moisture content of paper, or the like, once a calibration is made for the various compositions of wood, paper, etc., the moisture content of any specimen can be quickly determined.

For a better understanding of the invention, reference may be had to the accompanying drawings of which:

Fig. 1 illustrates diagrammatically the method of the invention as applied to the determination of percentage moisture content of material such as yarn, paper or the like;

Fig. 1a illustrates as an example of one specific circuit suitable for use in measuring the values involved, a Schering bridge;

Fig. 2 illustrates the method of the invention as applied to the determination of percentage moisture content of granular material; and Fig. 3 is a diagram illustrating the types of relationship between moisture content and $\Delta R_s/\Delta C$ obtainable for various different materials.

In practicing the invention, the relationship between moisture content and $\Delta R_s/\Delta C$ for a particular material and condenser is first obtained empirically. The capacity $C_0$ and equivalent series resistance $R_{s_0}$ of an air condenser, for example that indicated diagrammatically in Fig. 1 by the plates 2 and 4, are first measured by means of any suitable measuring apparatus as indicated at 6. A sample of the particular material for which the relationship is to be determined and the percentage moisture content of which is known, is then inserted between the plates 2 and 4 and a new measure of equivalent series resistance, say $R_{s_{a'}}$, and of capacity, $C_{a'}$ is made. The ratio $$\frac{R_{s_{a'}} - R_{s_0}}{C_{a'} - C_0}$$

or $$\frac{\Delta R_s}{\Delta C}$$

is then plotted against the known percentage moisture content of the sample to give one point, for example, the point $a'$ on a scale such as indicated in Fig. 3. Additional points such as $a''$, $a'''$, etc. are similarly determined and a smooth curve, the curve A of Fig. 3 drawn through the point $a'$, $a''$, $a'''$. If the curve, as in the case of curve A of Fig. 3 is a straight line, relatively few points are necessary to determine the slope of the line. It so happens that the curves for various textile materials are substantially straight lines, but the method of the invention is not dependent upon a linear relationship between per cent moisture content and $\Delta R_s/\Delta C$. The points $a'$, $a''$, and $a'''$ of Fig. 3 may represent 5, 10 and 15 percent moisture content, respectively, of cotton material and may have been determined from the following values which represent typical measurements:

$$R_{s_0} = 0 \text{ ohms}$$
$$C_0 = 34.0 \ \mu\mu f.$$
$$R_{s_{a'}} = 36 \text{ ohms}$$
$$C_{a'} = 34.8 \ \mu\mu f.$$
$$R_{s_{a''}} = 94 \text{ ohms}$$
$$C_{a''} = 35.4 \ \mu\mu f.$$
$$R_{s_{a'''}} = 135 \text{ ohms}$$
$$C_{a'''} = 35.5 \ \mu\mu f.$$

which yield the values of $\Delta R_s/\Delta C$ at point $a'$ of 36/.8 or 45, for point $a''$ of 94/1.4 or 67, and for point $a'''$ of 175/1.5 or 90. Assuming, as above indicated, that the material used in obtaining the line A of Fig. 3 was cotton yarn, measurement of percentage moisture content of other cotton yarns, whether of the same or different weight and dimensions as the sample used for calibration may now be readily determined. For example; a length of yarn 8 from a reel 10 may be continuously passed between the plates 2 and 4 and measurements of equivalent series resistance and capacity taken at intervals. The percentage moisture content of the part of the yarn between the plates 2 and 4 can then be read directly from the chart, as $$\frac{R_{s_x} - R_{s_0}}{C_x - C_0} \text{ is } \frac{\Delta R_s}{\Delta C}$$

where $R_{s_x}$ and $C_x$ are the respective measured values of equivalent series resistance and capacity at the moment under consideration.

For other material, such as wool or rayon, the same procedure is followed. That is, a curve such as curve B may be obtained for woolen yarns, and one such as curve C, for rayon yarns. Once these curves, or lines, are obtained for any given apparatus, measurement of the moisture content of other samples of the corresponding materials may be directly determined as with the case of cotton yarn.

When moisture content of granular material is to be determined, apparatus such as indicated diagrammatically in Fig. 2 may be employed. As shown in Fig. 2, an endless traveling belt 12 may be passed between plates $2_a$ and $4_a$ of a condenser, the capacity and equivalent series resistance of which is to be measured. For calibration, that is to obtain a curve, such as curve D of Fig. 3, for any particular granular material, the capacity and equivalent series resistance of the condenser with the two stretches of the belt 12 therein, but without granular material on the belt, are taken as the reference values. Points on the curve are then obtained by measurements taken when material of known moisture content is between the plates, as described in connection with cotton yarn.

In the description so far given of the new method of determining percentage moisture content of material, no particular type of instrumentalities for measuring capacities and equivalent series resistance of condensers, have been specified, nor have instruments for automatically computing the desired ratio been specified, as the present invention is directed only to the broad principles underlying the new method and not to any specific apparatus for carrying out the actual measurements. Bridge or other type circuits for measuring these values are known in the art and the method as herein described can be practiced by the use of various types of measuring instruments. One such bridge type circuit suitable for measuring these values is described in an article by D. B. Sinclair on pages 310–18 of volume 28 of the Proceedings of the Institute of Radio Engineers. As an example of one specific circuit suitable for use in measuring these values, a Schering bridge is shown in Fig. 1a. In this circuit the resistors $R_a$ and $R_b$ may be fixed and the capacities $C_b$ and $C_c$ adjustable. When the bridge is in balance, that is when no voltage is impressed on the detector D, the capacity C of the test cell is equal to $C_c (R_b/R_a)$ and the equivalent series resistant $R_s$ is equal to $R_a (C_b/C_c)$. (See Terman's Radio Engineer's Handbook, first edition, page 905, Fig. 6 (f).) It will be apparent that the new method has a wide applicability in various industries, for example, in the textile industry, the food industry, the paper industry, or the building industry. When used in the textile industry, the curves or lines for the various materials would be plotted so as to give directly per cent moisture regain, rather than per cent moisture content.

As heretofore indicated, the relationship between per cent moisture content and $\Delta R_s/\Delta C$ for any material holds true for a relatively wide range of per cent moisture content irrespective of the weight or dimensions of the material, provided, however, that the thickness of the material is relatively small compared to the distance between condenser plates. For example the thickness of the material under test should be not more than fifty per cent of the distance between electrodes and preferably of the order of ten per cent or less. The humidity of the air between the condenser electrodes at the time measurements are made of moisture content does not need to be the same as when the characteristic curve for the particular material was determined but should not vary substantially between consecutive measurements made with, and without, the material between the electrodes when the difference values are being found. Wide temperature fluctuations sufficient to affect resistance measurement should be avoided. The calibration curve for a given material should be made at the same frequency as that used thereafter for moisture content measurement, any suitable frequencies such as ordinarily used in measuring equivalent series resistance may be used.

Obviously, the method of the invention could be employed for control of moisture content as well as for measurement thereof and could be used for moisture content measurements of other than flat and granular materials. Although flat condenser plates have been diagrammatically indicated in the drawings, their use is not essential as I have successfully practiced the invention with condensers having other types of electrodes.

Although the ratio $\Delta R_s/\Delta C$ has been described as a measure of the moisture content, and such ratio has been indicated in the chart of Fig. 3, obviously, the inverse ratio $\Delta C/\Delta R_s$ could as readily be employed.

I claim:

1. The method of determining moisture content of a definite type of material which comprises, first obtaining a relationship for that type of material between the per cent moisture content and the ratio of change in equivalent series resistance to change in capacity of a condenser occasioned by insertion of such material between the condenser electrodes, and thereafter using such relationship for determining moisture content of material of the same type but not necessarily of the same dimensions or weight from ratios of equivalent series resistance and capacity measurements of the condenser with the latter material between the electrodes.

2. The method of continuously determining the percentage moisture content of a material which includes passing the material between spaced plates of a condenser comparing the equivalent series resistance of the condenser and the capacity thereof when the material is between the plates with the corresponding values when no material is between the plates to obtain the changes in these values due to the presence of the material and determining the ratio of these changes to obtain percentage moisture content by reference to predetermined relationship between such ratios and known moisture contents for material of the same type.

3. The method of preparing a graph for use in moisture content measurements which comprises measuring both the equivalent series resistance and the capacity of a condenser with and without material of known moisture content between the plates of the condenser and plotting the ratio of change in these values as a function of moisture content.

4. The method of preparing a graph for use in per cent moisture content or regain measurement which comprises measuring the equivalent series resistance and capacity of an air condenser, inserting material of known moisture content or regain between the plates of the condenser and measuring the changed equivalent series resistance and capacity of the condenser, repeating these measurements for different per cent moisture content or regain, and finally plotting the ratio of the changes in equivalent series resistance to the changes in capacity as a function of the per cent moisture content or regain.

5. The method of measuring moisture in a material which includes determining both the equivalent series resistance and capacity of a condenser at a given frequency with and without the material between the plates of the condenser, and determining the ratio of the change in these values to obtain per cent moisture content of the material by reference to predetermined relationship between such ratio and known moisture contents for material of the same type.

6. The method of measuring per cent moisture content or regain of a material which comprises first preparing a graph for that material by measuring, at a constant frequency, the equivalent series resistance and capacity of a condenser with and without samples of the material of known moisture content or regain between the plates of the condenser, and plotting the ratio of change of equivalent series resistance to change in capacity as a function of per cent moisture content or regain, then inserting like material of unknown per cent moisture content or regain between the plates of the same condenser, measuring at the same frequency the equivalent series resistance and capacity of the condenser, to determine the change in these values as compared to those without the material between the condenser plates, and finally taking the ratio of these changes to determine the per cent moisture content or regain from the graph.

7. The method of determining per cent moisture content or regain of a material which comprises measuring the equivalent series resistance and capacity of a condenser the distance between the plates of which is large compared to the thickness of the material, inserting the material between the condenser plates and measuring the change in equivalent series resistance and the change in capacity of the condenser and finally determining the ratio of these changes to obtain per cent moisture content or regain determinations by reference to predetermined relationship between such ratio and known moisture content or regain for material of the same type.

WILMER CLAYTON ANDERSON.

REFERENCES CITED

The following references are of record in the file of this patent:

UNITED STATES PATENTS

| Number | Name | Date |
|---|---|---|
| 1,976,904 | Terman | Oct. 16, 1934 |
| 2,217,626 | Strang et al. | Oct. 8, 1940 |
| 2,349,992 | Schrader | May 30, 1944 |
| 2,373,846 | Olken | Apr. 17, 1945 |

OTHER REFERENCES

Alternating Current Bridge Methods by Hague, fourth edition, pages 352 and 353.